(12) United States Patent
Eckhardt (10) Patent No.: US 6,246,887 B1
(45) Date of Patent: Jun. 12, 2001

(54) APPLIANCE WITH INDICATING DEVICE

(75) Inventor: Claus-Chr. Eckhardt, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/199,378

(22) Filed: Nov. 25, 1998

(51) Int. Cl.[7] .............................. H04B 1/38; H04M 1/00
(52) U.S. Cl. ............................................ 455/566; 379/433
(58) Field of Search .................................... 379/433, 434, 379/440, 426, 428; 455/349, 566, 90, 145; 345/158, 169, 173; 14/138

(56) References Cited

U.S. PATENT DOCUMENTS

| | | |
|---|---|---|
| 4,292,481 | 9/1981 | Barnes . |
| 4,856,088 * | 8/1989 | Oliwa et al. .......................... 455/349 |
| 5,146,615 | 9/1992 | Hodsdon . |
| 5,745,566 * | 4/1998 | Petrella et al. ...................... 379/433 |
| 5,768,370 * | 6/1998 | Maatta et al. ........................ 379/433 |
| 5,842,116 * | 11/1998 | Nishida et al. ........................ 455/90 |
| 5,848,152 * | 12/1998 | Slipy et al. .......................... 379/433 |
| 5,982,881 * | 11/1999 | Mischenko .......................... 379/433 |
| 6,009,336 * | 12/1999 | Harris et al. ......................... 455/566 |
| 6,031,524 * | 2/2000 | Kunert ................................ 345/173 |

FOREIGN PATENT DOCUMENTS

| | | |
|---|---|---|
| 94 03 890 | 7/1995 | (DE) . |
| 2 293 517 | 3/1996 | (DE) . |

* cited by examiner

Primary Examiner—Vivian Chang
Assistant Examiner—Charles N. Appiah
(74) Attorney, Agent, or Firm—Michael J. Striker (57) ABSTRACT

An appliance has an indicating device, means forming an outer surface provided with a throughgoing opening for receiving the indicating device, means forming an edge region which surrounds the throughgoing opening and is depressed, the edge region being formed so that the decorative part is inserted in the edge region, and a releasable connection between the decorative part and the edge region.

14 Claims, 4 Drawing Sheets

APPLIANCE WITH INDICATING DEVICE

BACKGROUND OF THE INVENTION

The present invention generally relates to an appliance with an indicating device.

Appliances of the above mentioned general type are known in the art. In particular, an appliance is known which is formed as a cordless telephone with an outer surface provided with a throughgoing passage for receiving an indicating device. An edge region which surrounds the throughgoing opening of the appliance is depressed relative to the outer surface of the appliance. The edge region operates as a supporting surface for a transparent disk for covering an indicating device which is formed for example as a display.

Moreover, it is known to decorate the edge region, for example by applying a granulate or a lacquer.

SUMMARY OF THE INVENTION

Accordingly, it is an object of the present invention to provide an appliance with an indicating device which is further improvement of the existing appliances.

In keeping with these objects and with others which will become apparent hereinafter, one feature of the present invention resides in an appliance, in which on the edge region, a decorative part is insertable, and is mountable on the edge region by a releasable connection.

When the appliance is designed in accordance with the present invention, the decorative part is provided which in a simple manner without damaging the appliance housing is mounted on the edge region or can be premounted on it. In this way the consumer must not look for an experienced person and without loosing a guarantee can exchange the decorative part in accordance with its taste and replace with another decorative part, so that the outer surface of the housing can be designed individually. For example, the consumer can use a different decorative part which are sold by the manufacturer.

In accordance with another feature of the present invention, the releasable connection can be formed as an adhesive connection. Such a connection is especially stable.

In accordance with still a further feature of the present invention, the releasable connection can be formed as an arresting connection. In this way the decorative part can be stably connected with the edge region, and also a simple and accurately defined mounting or dismounting can be performed by means of the available arresting elements.

In accordance with still a further feature of the present invention, a gap is provided between the decorative part and the edge region for receiving for example a turning tool for releasing the connection. In this manner, the dismounting can be performed simply and does not need special finger strength.

In accordance with still a further feature of the present invention, the edge region can be de pressed by two steps relative to the outer surface of the appliance, so as to include a deeper step for limiting the throughgoing passage in which a transparent disk covering the indicating device is placed, and a higher step on which the decorative part is placed. In this way, the covering of the indicating device and the decoration can be applied independently from one another on the housing or removed from the housing.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
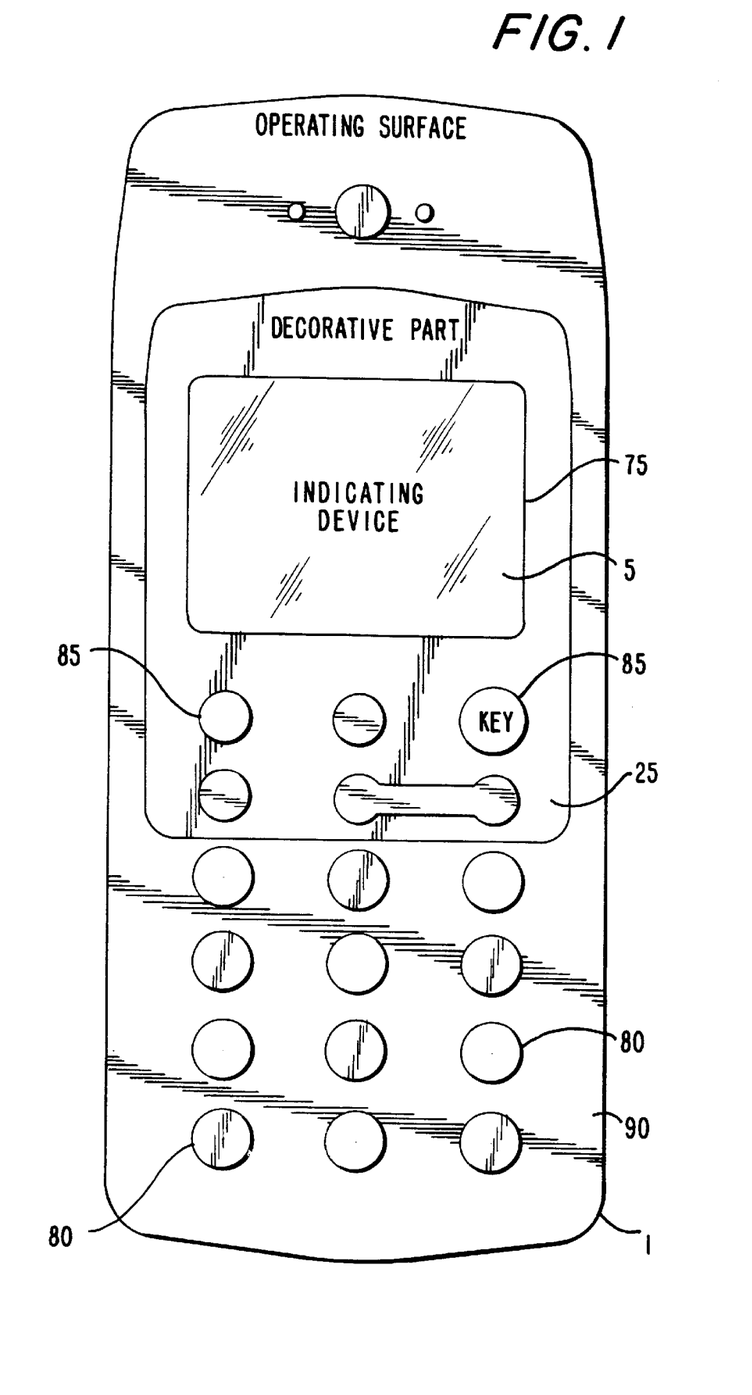
FIG. 1 is a view of an operating surface of a cordless telephone in accordance with the present invention.

FIG. 1 shows an appliance in accordance with the present invention which is formed as a cordless telephone 1. Its operating surface shown in FIG. 1 is identified with reference numeral 90. An indicating device 5 is inserted in the operating surface 9 and covered by a transparent disk 75. The indicating device 5 and the transparent disk 75 are surrounded by a decorative part 25. The decorative part 25 also surrounds five keys 85 of the key field on the operating surface 90. For this purpose the decorative part 25 is provided with throughgoing openings for receiving the indicating device 5 and for receiving the keys 85. The operating surface 90 of the cordless telephone 1 also has twelve keys 80 located outside of the decorative part 25.

Figure 2:
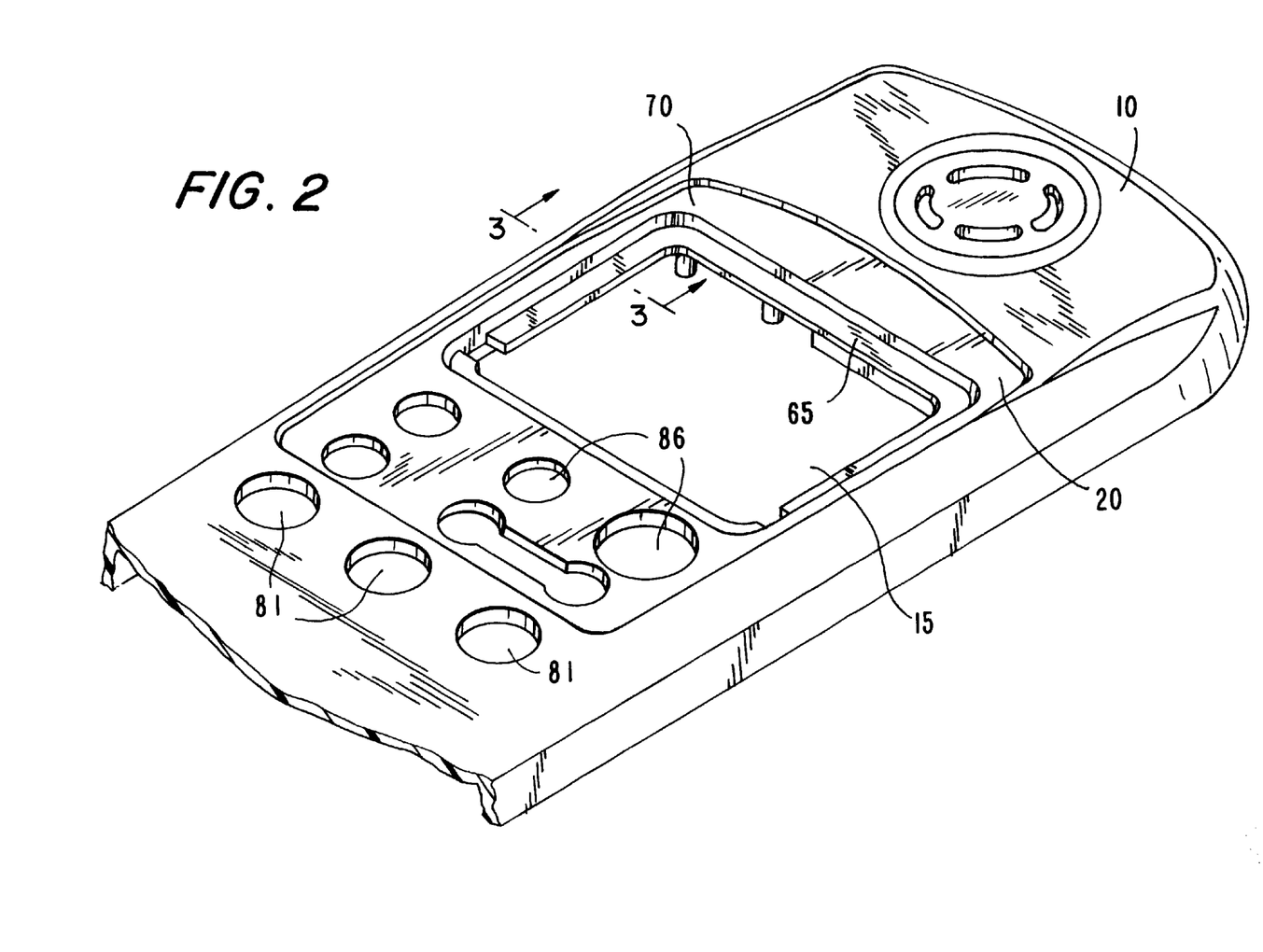
FIG. 2 is a spacial view of a display-end decorating region of the cordless telephone.

FIG. 2 shows the outer surface 10 of the cordless telephone 1 from the side of the operating surface 90. The outer surface 10 of the appliance has a throughgoing opening 15 for receiving the indicating device 5, as well as an edge region 20 which surrounds the throughgoing opening 15 and is depressed with two stages relative to the outer surface 10 of the appliance. A deeper stage 65 of the two-stage edge region 20 which limits the throughgoing opening 15 serves for supporting a transparent disk 75 which covers the indicating device 5. A higher step 70 of the two-step edge region 20 serves for supporting the decorative part 25. The higher stage 70 of the two-edge region has also five throughgoing openings 86 for receiving the keys 85 located inside the decorate part 25. For the keys 80 located outside of the decorative part 25, throughgoing openings 81 are provided correspondingly in the outer surface 10 of the appliance.

The decorative part 25 is inserted on the edge region 20 and mounted on the edge region 20 by a releasable connection. The releasable connection can be formed for example as an adhesive connection. As can be seen in a vertical cross-section A-A in the edge region 20 of the cordless telephone 1, in FIG. 3 the mounting of the decorative part 25 on the edge region 20 is shown. The decorative part 25 is connected by a double-side adhesive band 30 with the higher stage 70 of the two-stage edge region 20. A gap 35 is formed between the decorative part 25 and the higher stage 70, toward the deeper stage 65 of the two-stage edge region 20 through the double-sided adhesive band 30.

Figure 3:
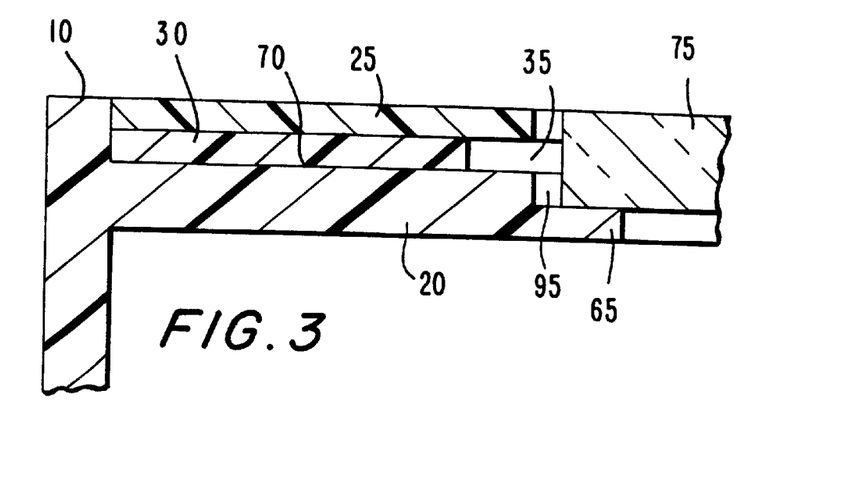
FIG. 3 is a view showing a section through an edge region with a glued decorative part.

The transparent disk 75 is located on the deeper stage 65. The connection between the transparent disk 75 and the deeper stage 65 is not shown, however it also can be performed by adhesive. A second gap 95 is formed between the transparent disk 75 on the one hand and the decorative part 25 and the higher stage 70 on the other hand. Together with the first gap 35, the second gap 95 allows outer access for releasing of the connection. The releasing of the adhesive connection can be performed for example manually. The first gap 35 can also serve for receiving a turning tool, so that when the turning tool is placed on the edge of the transparent disk 75 a lever action can be applied to the adhesive connection without high efforts and without damaging the edge region 20 so that the transparent disk 75 can be released. FIG. 3 shows the outer surfaces of the decorative part 25 and the transparent disk 75, as well as the outer surface 10 of the appliance which are arranged in one plane. The decorative part 25 has the same width as the higher step 70. From the design reasons, however other dimensions are recommended as well.

In FIG. 3 an adhesive surface is identified with a reference numeral 30. The decorative part 25 is provided with this adhesive surface at its side which faces the edge region 20 and is connected with the edge region 20 in a self-adhesive manner by this surface.

Figure 4:
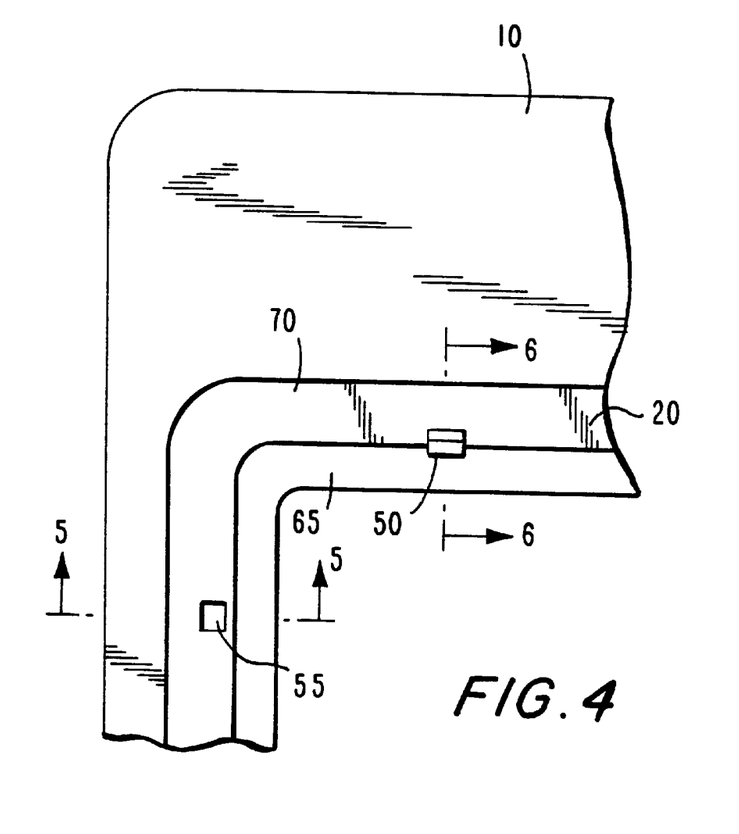
FIG. 4 is a view showing a section of the edge region with an arresting projection and an arresting opening.
Figure 5:
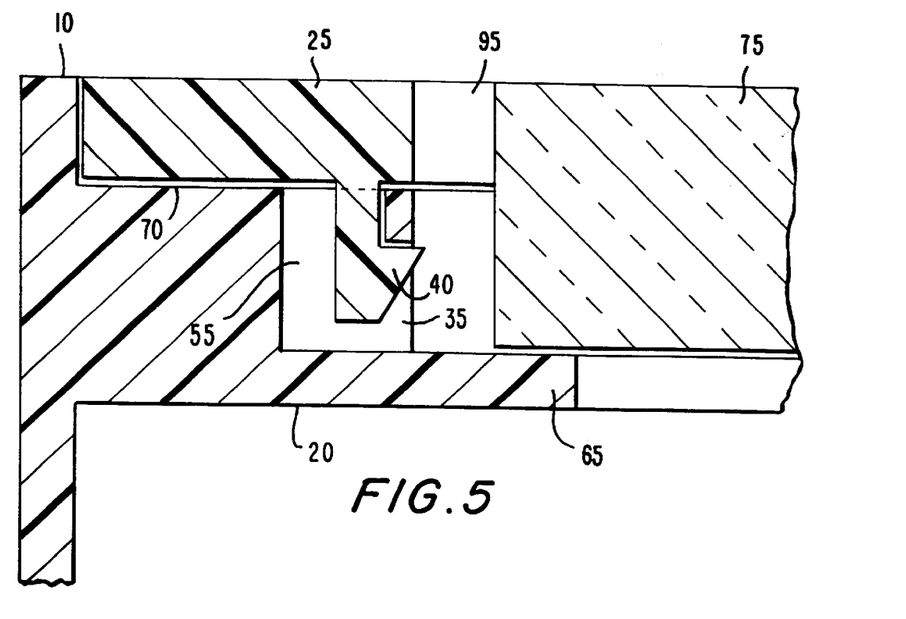
FIG. 5 is a view showing a section through the edge region with an arresting projection of the decorative part engaging in the edge region.
Figure 6:
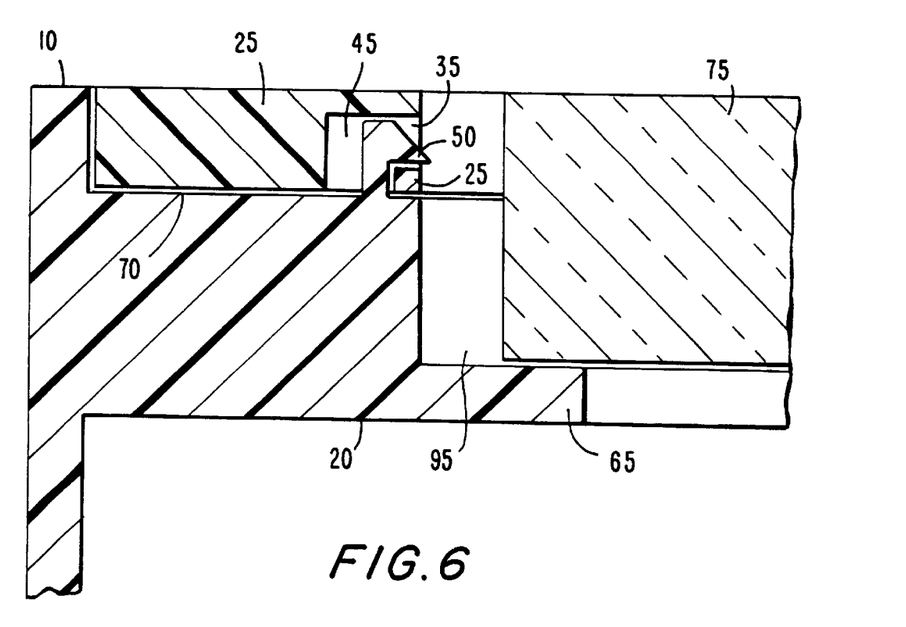
FIG. 6 is a view showing a section through the edge region with the arresting projection of the edge region engaging in the decorative part.

An arresting connection can be also used as a releasable connection between the decorative part 25 and the edge region 20. Such a connection is shown in FIGS. 4, 5 and 6. FIG. 4 shows the outer surface 10 of the appliance on a corner of the two-stage edge region 20. The higher stage 70 has an arresting projection 50 and an arresting opening 55. Further arresting projections and arresting openings can be provided in the part of the edge region 20 which is not shown in FIG. 4. For illustration of the arresting connection, FIG. 5 shows a vertical cross-section B-B through the edge region 20 at the location of the arresting opening 55, and FIG. 6 shows a vertical section C-C through the edge region 20 at the location of the arresting projection 50.

In contrast to FIG. 3, the decorative part 25 in FIG. 5 is connected with the higher step 70 of the two-step edge region not by an adhesive layer. Moreover, the decorative part 25 at its side facing the edge region 20 has an arresting projection 40 which engages in the arresting opening 55 of the higher step 70 of the edge region 20, which faces the decorative part 25. The arresting opening 55 opens between the higher step 70 and the deeper step 65 in direction toward the transparent disk 70. The transparent disk 70 is placed on the deeper step 65 and separated from the higher step 70 by a second gap 95. In particular, the arresting opening 55 opens into a first gap 35 for receiving the arresting projection of the decorative part 25. The arresting projection 40 can be simply pressed back through the first and second gaps 35, 95 by hand or in a simple manner by a turning tool, so that the decorative part 25 is removable.

In FIG. 6 the arresting projection 50 of the higher step 70 of the two-step edge region 20, which faces the decorative part 25, engages an arresting opening 45 of the decorative part 25 which faces the higher step 70. In contrast to FIG. 3, no adhesive layer is provided between the decorative part 25 and the higher step 70. The arresting opening 45 of the decorative part 25 which faces the higher step 70 opens into the first gap 35 for receiving the arresting projection 50 of the higher step 70. The first gap 35 is oriented toward the transparent disk 75 which is placed on the deeper stage 65 and is separated by a first gap 95 from the higher step 70. The arresting projection 50 of the higher step 70 of the edge region 20 is pressed back by hand or simply by a turning tool through the first and the second gaps 35, 95, so that the decorative part 25 can be removed in a simple manner.

The decorative part 25 can be formed as a synthetic plastic part, as a wood part, or as a metal part, formed for example as a foil or as a rigid part. The application of this invention is not only a cordless telephone, but also any appliance in which an indicating device is surrounded by a decorative part. It can be also a radio device which an image screen on the outer surface of the appliance is surrounded by a decorative part, etc.

It will be understood that each of the elements described above, or two or more together, may also find a useful application in other types of constructions differing from the types described above.

While the invention has been illustrated and described as embodied in appliance with decorative device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

What is claimed is:

1. An appliance, comprising an indicating device; a decorative part; means forming a wall having an outer surface with a central region and an inner surface, said wall being provided with a throughgoing opening which extends from said outer surface to said inner surface of said wall and receives said indicating device, said wall also having a surrounding edge region which surrounds said throughgoing opening and is depressed relative to said outer surface of said wall so as to form a depression, said decorative part being formed as a structural element which is separate from said indicating device and being inserted in said depression of said edge region; and means for releasably connecting said decorative part with said edge region independently from said indicating device, so that said decorative part can be removed from said depression of said edge region of said wall without said indicating device and replaced by another decorative part inserted in said depression of said edge region of said wall.

2. An appliance as defined in claim 1, wherein said means for releasably connecting is formed as an adhesive connection.

3. An appliance as defined in claim 2, wherein said adhesive connection includes a double-sided adhesive band.

4. An appliance as defined in claim 2, wherein said decorative part has a side facing toward said edge region and is provided at said side with an adhesive surface which is self-adhesively connected with said edge region, so as to form said releasably connecting means.

5. An appliance as defined in claim 1, wherein said decorative part has a further throughgoing opening for receiving said indicating device.

6. An appliance as defined in claim 5, wherein said decorative part has a plurality of additional throughgoing openings for receiving keys.

7. An appliance as defined in claim 1, wherein said decorative part has a plurality of additional throughgoing openings for receiving keys.

8. An appliance as defined in claim 1, wherein said releasable connection includes an arresting connection.

9. An appliance as defined in claim 8, wherein said arresting connection includes an arresting projection provided on said decorative part and an arresting opening provided on said edge region in which said arresting projection is engageable.

10. An appliance as defined in claim 8, wherein said arresting connection includes an arresting projection formed in said edge region, and an arresting opening provided in said decorative part in which said arresting projection is arrestable.

11. An appliance as defined in claim 1, wherein said decorative part and said edge region are arranged so that a gap is provided between said decorative part and said edge region for receiving a tool in order to release said connection.

12. An appliance as defined in claim 1, wherein said edge region is depressed in a two-step manner relative to said outer surface.

13. An appliance as defined in claim 12, wherein said edge region has a deeper step which limits said throughgoing opening; and further comprising a transparent disk which covers said indicating device and is placed on said deeper step.

14. An appliance as defined in claim 12, wherein said edge region has a higher step on which said decorative part is placed.

* * * * *

UNITED STATES PATENT AND TRADEMARK OFFICE
CERTIFICATE OF CORRECTION

PATENT NO. : 6,246,887 B1  Page 1 of 1
APPLICATION NO. : 09/199378
DATED : June 12, 2001
INVENTOR(S) : Claus-Chr. Eckhardt It is certified that error appears in the above-identified patent and that said Letters Patent is hereby corrected as shown below:

Title page
Please add at Item [21]:

Divisional Application of Patent No.: 5,960,078

Please add as Foreign Application Priority Data:

Feb 14, 1996 [DE]   296 02 545 U

Signed and Sealed this

Sixteenth Day of February, 2010

David J. Kappos
*Director of the United States Patent and Trademark Office*

(12) EX PARTE REEXAMINATION CERTIFICATE (7533rd)
United States Patent
Eckhardt (10) Number: US 6,246,887 C1
(45) Certificate Issued: May 25, 2010

(54) APPLIANCE WITH INDICATING DEVICE (75) Inventor: Claus-Chr. Eckhardt, Hannover (DE)

(73) Assignee: Karols Development Co. LLC, New York, NY (US)

Reexamination Request:
No. 90/010,624, Sep. 28, 2009

Reexamination Certificate for:
Patent No.: 6,246,887
Issued: Jun. 12, 2001
Appl. No.: 09/199,378
Filed: Nov. 25, 1998

Certificate of Correction issued Feb. 16, 2010.

Related U.S. Application Data (62) Division of application No. 08/799,274, filed on Feb. 13, 1997, now Pat. No. 5,960,078.

(30) Foreign Application Priority Data

Feb. 14, 1996 (DE) .......................................... 2 96 02 545

(51) Int. Cl.
*H04M 1/02* (2006.01)

(52) U.S. Cl. .................... 455/566; 379/433.04
(58) Field of Classification Search .................. 455/566
See application file for complete search history.

(56) References Cited

U.S. PATENT DOCUMENTS

| 4,292,481 | A | | 9/1981 | Barnes | |
|---|---|---|---|---|---|
| 4,478,521 | A | | 10/1984 | Evans et al. | |
| 4,771,277 | A | | 9/1988 | Barbee et al. | |
| 4,856,088 | A | * | 8/1989 | Oliwa et al. | 455/349 |
| 5,077,832 | A | | 12/1991 | Szozutkowski et al. | |
| 5,146,615 | A | | 9/1992 | Hodsdon | |
| 5,214,794 | A | | 5/1993 | Vanwinen et al. | |
| 5,253,139 | A | | 10/1993 | Satou | |
| 8,533,977 | | | 9/1995 | Michenko | |
| 5,679,943 | A | | 10/1997 | Schultz et al. | |
| 5,722,055 | A | | 2/1998 | Kobayashi et al. | |
| 5,745,566 | A | * | 4/1998 | Petrella et al. | 379/433 |
| 5,768,370 | A | * | 6/1998 | Maatta et al. | 379/433 |
| 5,842,116 | A | * | 11/1998 | Nishida et al. | 455/90 |
| 5,848,152 | A | * | 12/1998 | Slipy et al. | 379/433 |
| 5,982,881 | A | * | 11/1999 | Mischenko | 379/433 |
| 6,009,336 | A | * | 12/1999 | Harris et al. | 455/566 |
| 6,031,524 | A | * | 2/2000 | Kunert | 345/173 |

FOREIGN PATENT DOCUMENTS

| DE | 1512755 | 10/1969 |
|---|---|---|
| DE | 3726225 | 8/1988 |
| DE | 8717813 | 5/1990 |
| DE | 9001461 | 7/1990 |
| DE | 9115377 | 3/1992 |
| DE | 94 03 890 U | 7/1995 |
| DE | 9403890 | 8/1995 |
| DE | 29503827 | 11/1995 |
| DE | 2 293 517 A | 3/1996 |
| DE | 296 02 545 U1 | 6/1996 |
| DE | 19639197 | 5/1997 |
| EP | 03021898 | 2/1989 |
| GB | 2212334 | 7/1989 |
| GB | 2293517 | 3/1996 |
| GB | 2298759 | 9/1996 |
| GB | 2305810 | 4/1997 |

OTHER PUBLICATIONS

"Die Stars der Strasse", Journal—Connect May 1993, 14–22.
"Generationswechsel", Journal—Connect Jan. 1996, 18–23.
"Klein aber oho", Journal—Connect Jan. 1993, 56–61.
"Telefonieren ohne Grenzen", Advertising brochure—Hagenuk Telekommunikation Mar. 24, 1993.
"Ungleiches Paar", Journal—Connect May 1994, 12–16.
Hausbauer, Hermann "Siemens teamset 200—Design, Ergonomie und konstruktiver Aufbau mikroprozessor", gesteuerter Burotelefonanlagen. In: telecom report 5 (1982), H.5 00/00/1982, 298–302.

* cited by examiner

*Primary Examiner*—Eric B Kiss (57) ABSTRACT

An appliance has an indicating device, means forming an outer surface provided with a throughgoing opening for receiving the indicating device, means forming an edge region which surrounds the throughgoing opening and is depressed, the edge region being formed so that the decorative part is inserted in the edge region, and a releasable connection between the decorative part and the edge region.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, line 1:

*This patent is a divisional of Application Ser. No. 08/799,274, filed Feb. 13, 1997, now U.S. Patent No. 5,960,078.*

AS A RESULT OF REEXAMINATION, IT HAS BEEN DETERMINED THAT:

The patentability of claims 1-14 is confirmed.

\* \* \* \* \*